US011428816B2

(12) United States Patent
Koger et al.

(10) Patent No.: US 11,428,816 B2
(45) Date of Patent: *Aug. 30, 2022

(54) LIDAR DATA AND STRUCTURAL MODELING BASED ELEVATION DETERMINATION

(71) Applicant: Qrisq Analytics, LLC, Mobile, AL (US)

(72) Inventors: Thomas Lee Koger, Diamondhead, MS (US); Elizabeth Lia Valenti, Slidell, LA (US)

(73) Assignee: Qrisq Analytics, LLC, Mobile, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/143,806

(22) Filed: Jan. 7, 2021

(65) Prior Publication Data
US 2022/0128695 A1 Apr. 28, 2022

Related U.S. Application Data

(63) Continuation-in-part of application No. 15/604,464, filed on May 24, 2017, now abandoned.
(Continued)

(51) Int. Cl.
*G06F 30/10* (2020.01)
*G01S 17/894* (2020.01)
(Continued)

(52) U.S. Cl.
CPC .......... *G01S 17/894* (2020.01); *G01C 15/008* (2013.01); *G01S 7/4808* (2013.01);
(Continued)

(58) Field of Classification Search
None
See application file for complete search history.

(56) References Cited

U.S. PATENT DOCUMENTS 7,832,267 B2  11/2010  Woro
8,655,595 B1   2/2014  Green et al.
(Continued)

OTHER PUBLICATIONS

Karen, "Outliers: To Drop or Not to Drop," URL=https://web.archive.org/web/20140607034244/http://www.theanalysisfactor.com/outliers-to-drop-or-not-to-drop/, download date Nov. 21, 2019, 6 pages.

*Primary Examiner* — Hovhannes Baghdasaryan
(74) *Attorney, Agent, or Firm* — Seed IP Law Group LLP

(57) ABSTRACT

Systems and methods for determining elevation based on structural modeling and light detection and ranging (LIDAR) data are disclosure. LIDAR bare earth data corresponding to an area within a parcel boundary is obtained as preliminary elevation data. A basis of structure boundary is determined for a structure within the parcel boundary based on an absence of the LIDAR bare earth data within a region in the area. Three-dimensional models are generated based on photographic data, to represent portions of the structure that affect LIDAR signals. A structure boundary for the structure is determined based on the basis of structure boundary in combination with supplemental elevation data generated using the three-dimensional models. Adjacent grade values are determined based on a portion of the preliminary elevation data and supplemental elevation data corresponding to an area between the structure boundary and a buffer boundary.

20 Claims, 12 Drawing Sheets

Related U.S. Application Data

(60) Provisional application No. 62/340,989, filed on May 24, 2016.

(51) Int. Cl.
*G01C 15/00* (2006.01)
*G01S 17/42* (2006.01)
*G01S 7/48* (2006.01)
*G06F 17/00* (2019.01)
*G06F 30/13* (2020.01)

(52) U.S. Cl.
CPC ............. *G01S 17/42* (2013.01); *G06F 17/00* (2013.01); *G06F 30/10* (2020.01); *G06F 30/13* (2020.01)

(56) References Cited

U.S. PATENT DOCUMENTS

| | | |
|---|---|---|
| 9,701,408 B1 | 7/2017 | Willison |
| 10,664,849 B2 * | 5/2020 | Valenti ................... G01C 15/00 |
| 2013/0197807 A1 | 8/2013 | Du et al. |
| 2014/0229420 A1 * | 8/2014 | Green ................... G06N 5/048 |
| | | 706/52 |
| 2016/0063635 A1 | 3/2016 | Collazo et al. |
| 2017/0039307 A1 * | 2/2017 | Koger ..................... G06F 30/23 |
| 2017/0345017 A1 * | 11/2017 | Koger .................. G06Q 30/018 |
| 2017/0365094 A1 | 12/2017 | Liu et al. |

* cited by examiner

LIDAR DATA AND STRUCTURAL MODELING BASED ELEVATION DETERMINATION

BACKGROUND

The present disclosure generally relates to technologies for determining elevation, and in particular, determining elevation for structures. Elevation determination can play an important role in various situations, such as geographic or weather related assessment. Traditional means for determining elevation can be costly, time consuming, and often lacks sufficient accuracy. There is a need for more efficient, convenient, and accurate elevation determination techniques.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIGS. 5A-5F, collectively, represent at least one arrangement of known FEMA Form 086-0-33.

DETAILED DESCRIPTION

In the following description, certain specific details are set forth in order to provide a thorough understanding of various disclosed embodiments. However, one skilled in the relevant art will recognize that embodiments may be without one or more of these specific details, or with other methods, components, materials, etc. In other instances, well-known structures associated with computer systems including client and server computing systems, as well as networks have not been shown or described in detail to avoid unnecessarily obscuring descriptions of the embodiments.

A Flood Elevation Certificate is a certified document generated by a surveyor, engineer, or some other qualified, licensed person. The Flood Elevation Certificate, which is also referred to as an "FEC" or simply an "elevation certificate," captures data used to rate a subject property for flood insurance. The elevation certificate precisely identifies where the subject property is located in relationship to a Base Flood Elevation.

Figure 5A:
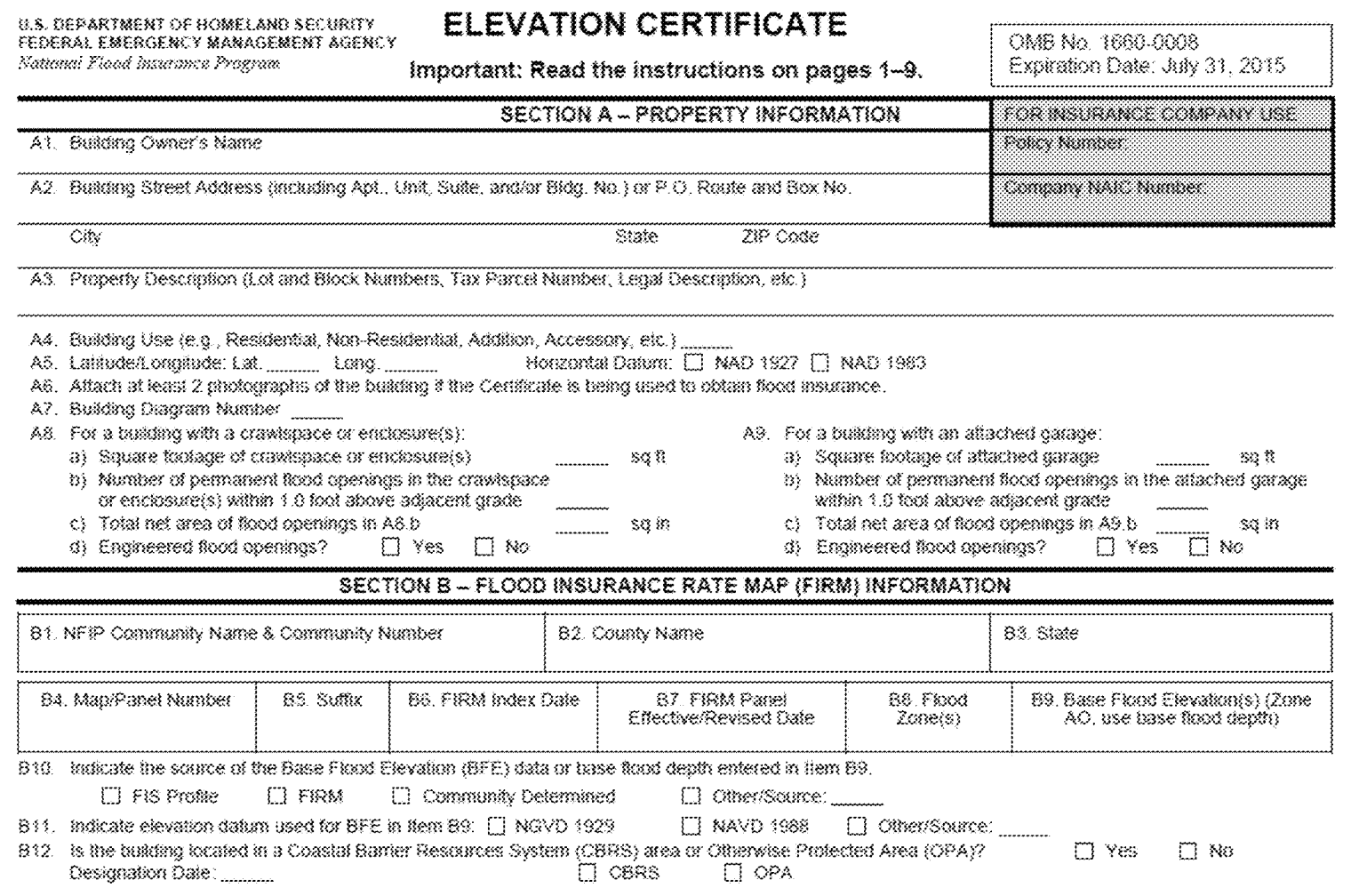
Figure 5B:
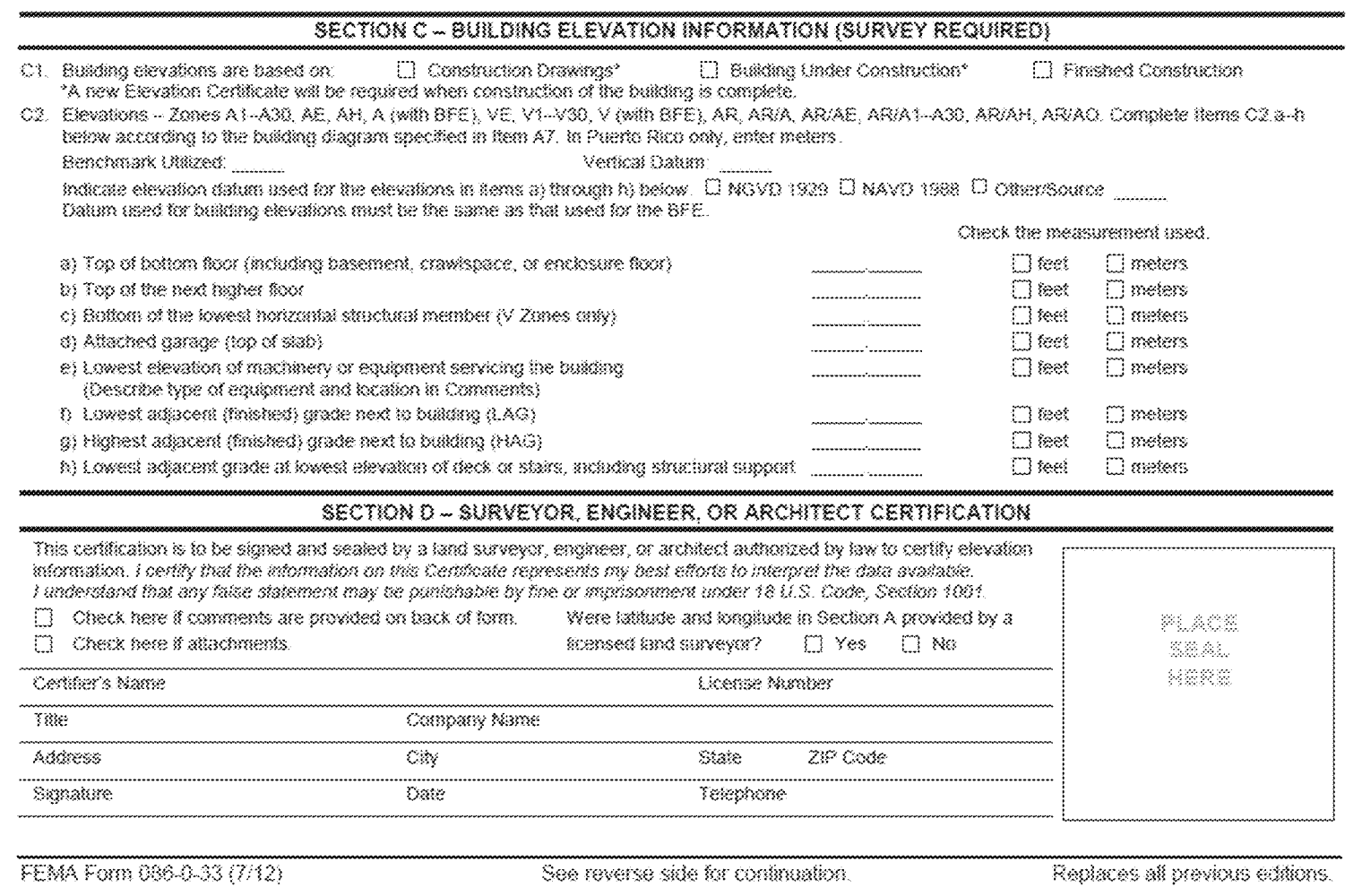
Figure 5C:
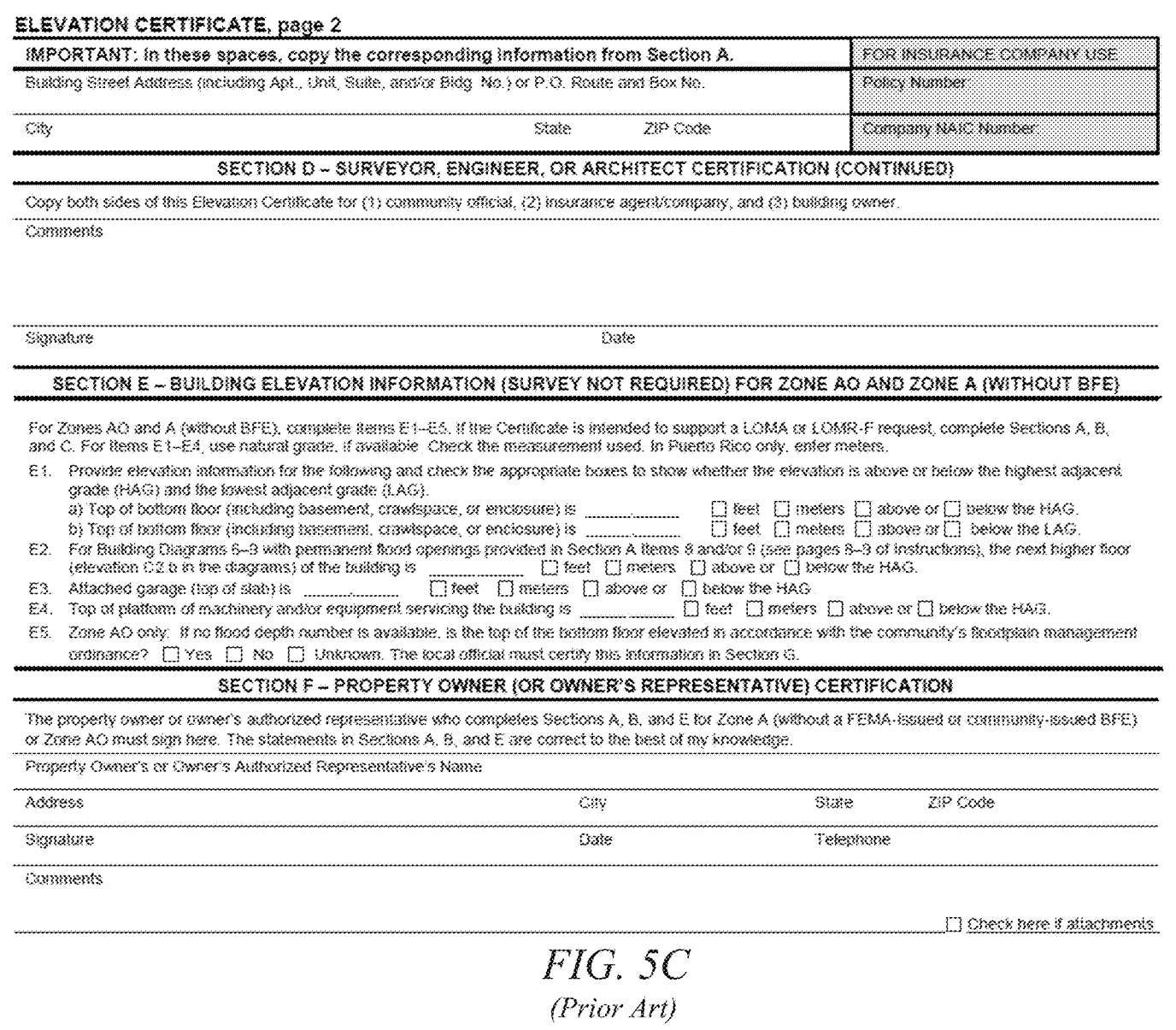
Figure 5D:
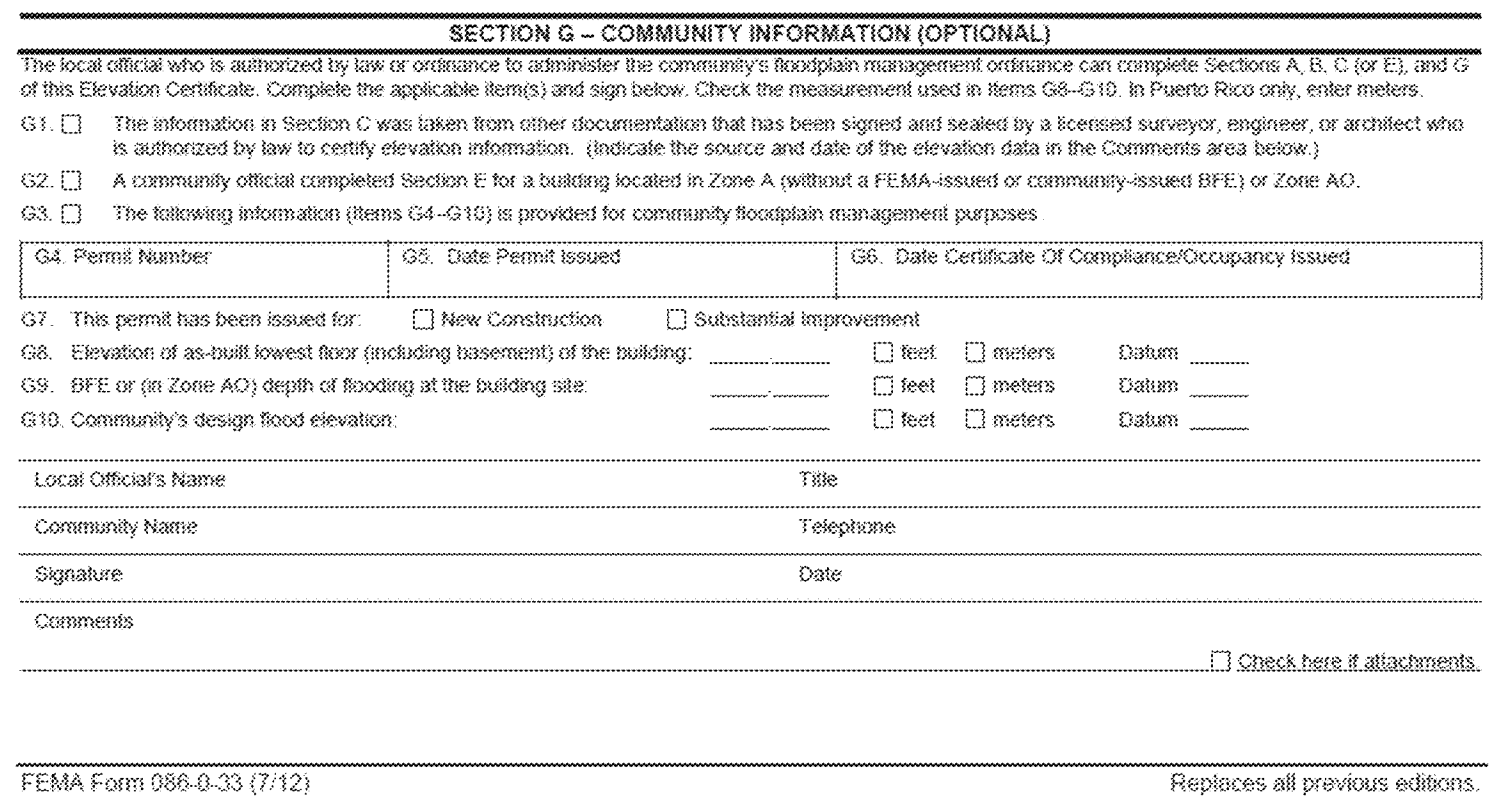
Figure 5E:
Figure 5F:
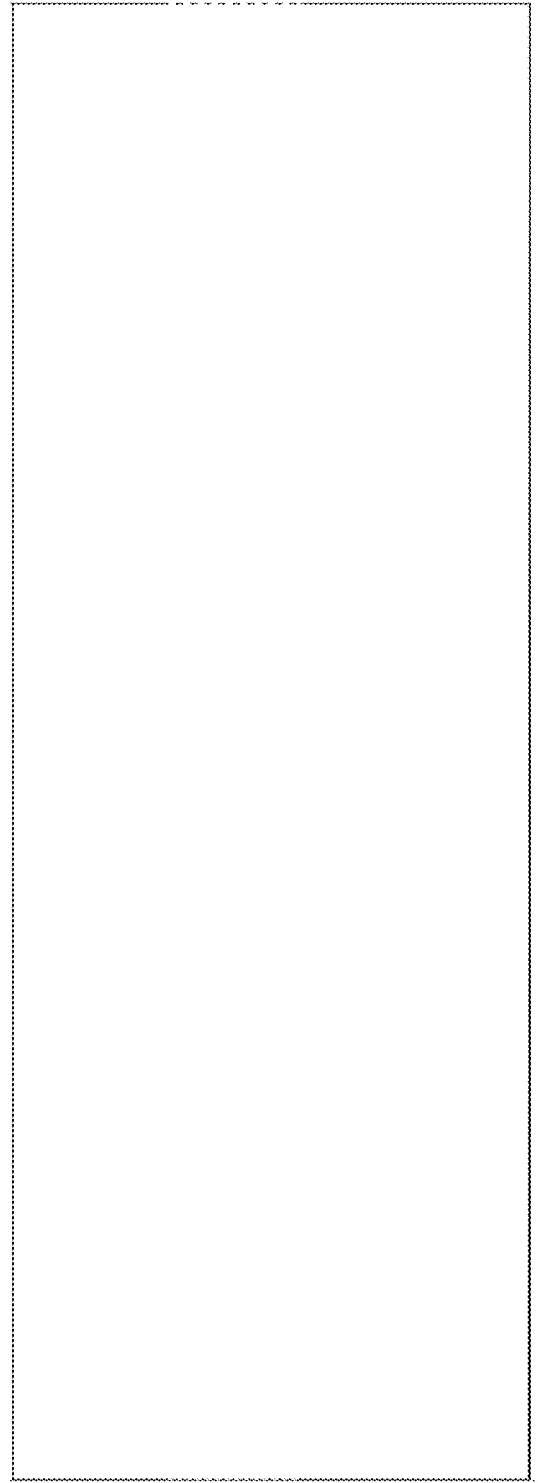

FIGS. 5A-5F, collectively, represent at least one arrangement of known FEMA Form 086-0-33. This particular elevation certificate is made available by the Federal Emergency Management Agency (FEMA) as FEMA Form 086-0-33. Different sections of the elevation certificate in FIGS. 5A-5F are assigned an alphabetical reference label, and various portions of each section (i.e., subsections) are assigned a numerical reference label. For example, the elevation certificate of FIGS. 5A-5F includes Sections A-G. Section A in FIG. 5A of the elevation certificate is dedicated to information specific to the property. Section B, which is also presented in FIG. 5A, is directed to flood insurance rate map information. In FIG. 5B, Section C of the elevation certificate is directed to building elevation information based on a survey. Spanning portions of FIGS. 5B and 5C, Section D is reserved for certification information associated with a named surveyor, engineer, or architect. Sections E and F in FIG. 5C are directed, respectively, toward certain building elevation information and toward property owner or suitable representative certification information. In FIG. 5D, Section G is arranged to store optional community information. FIGS. 5E and 5F are abbreviated pages representing one or more sections of the elevation certificate reserved for photographs of the subject property.

The Flood Disaster Protection Act of 1973 (FDPA) outlines pre-conditions necessary for a property owner to receive any direct or indirect federal financial assistance required or requested as a result of a flood. Before the property owner becomes entitled to federal financial assistance, the FDPA mandates a purchase of flood insurance for any property located in a Special Flood Hazard Area, and the price of flood insurance is based on the information contained in a properly completed Flood Elevation Certificate.

Elevation certificates are required for structures with high flood risk (i.e., structures located in a Special Flood Hazard Area) as a condition for obtaining flood insurance from insurers and the National Flood Insurance Program (NFIP). The elevation certificate is used by an insurance provider to determine the property-specific insurance rate premium based on the structure's elevation relative to the Base Flood Elevation (BFE).

An elevation certificate provides a rating entity with information regarding the location of the building, the lowest floor elevation, building construction characteristics, identification of a flood zone, and other property characteristics useful in a rate determination analysis. The flood zones and the BFE are determined through flood insurance studies conducted by FEMA. The rating entity provides rate determination analysis information, which is then used by the insurance provider to determine an insurance rate premium offered to a property owner.

Elevation certificates may also be required by communities participating in the Community Rating System (CRS). The CRS is a FEMA program that provides for flood insurance discounts in communities that follow federal guidelines to mitigate flood risk within the community.

The cost of an elevation certificate, which is conventionally prepared by a licensed surveyor, engineer, or another qualified person, is borne by the property owner. The cost for elevation certificate preparation can be prohibitive for some, costing several hundred to well over a thousand dollars. The cost of obtaining an elevation certificate has been identified as a major impediment to property owners seeking flood insurance. The disincentive produced by the high cost contributes to the undercapitalization of the NFIP and the ability to optimize a rate structure through appropriately distributed risk. Further exacerbating the problem is the time required to obtain and schedule services of a licensed, qualified professional. Homeowners can wait a month or more for the elevation certificate to be completed, which puts mortgages on hold and properties at risk for uninsured loss.

The elevation certificate arrangement of FIGS. 5A-5F is referred to in the present disclosure. Different sections of the elevation certificate are assigned an alphabetical reference label, and various portions of each section (i.e., subsections) are assigned a numerical reference label. When the reference labels are used herein, these identifiers are presented for ease in understanding of the subject matter in the present disclosure, and the identifiers are not expressly limiting. For example, the elevation certificate of FIGS. 5A-5F includes subsection A1 to identify a "Building Owner's Name," and subsection A2 is included to identify the "Building Street Address." In other elevation certificates, a particular building owner name and building street address may have different identifiers or even no identifiers at all. Accordingly, the particular fields of the elevation certificate of FIGS. 5A-5F are informative, but not limiting.

Systems and methods described in the present disclosure produce a set of geospatial characteristics for a subject property, which are then used to generate data for a Flood Elevation Certificate. As previously described herein, the Flood Elevation Certificate may also be referred to as an FEC or simply an elevation certificate. The systems and methods leverage remote elevation data and measurements (e.g., light detection and ranging (LIDAR) elevation measurements) with computer assisted on-site inspection to produce elevation certificates in a way that meets FEMA accuracy standards at higher speed and lower costs than prior approaches. In at least some cases, FEMA requires geographic accuracy within six (6) inches. The acceptably high accuracy of LIDAR elevation data supplants or otherwise supplements the use of expensive ground surveys. Embodiments of the systems and methods provided herein will geocode the address for the property of interest, resolve the property boundaries, and derive boundaries of the structure that is the subject of the elevation determination. In these and other embodiments, the systems and methods will then access and retrieve information from one or more databases (e.g., a FEMA database) and apply the information to determine the position of particular property features with respect to the FEMA flood insurance rate maps where the flood zone type and the BFE for the property can be determined.

The geospatial characteristics of the property are used to determine a lowest adjacent grade (LAG) value, highest adjacent grade (HAG) value, and other values. The LAG and HAG values are required for a proper elevation certificate. Additionally, in these or other embodiments, supporting data such as the proximity to the nearest identified water hazard may be calculated via one or more automated geospatial analysis logic modules.

In addition to the LAG and HAG values, embodiments of the systems and methods described herein may also identify and capture information representing the elevation datum and the map projection that are utilized to geolocate the subject property and any selected structures on the subject property. By controlling and verifying the information representing the datum and map projections, errors introduced through datum conversion, utilization of different geospatial references, and the like may be acceptably reduced or eliminated.

LAG values, HAG values, elevation data, map projection data, and other geospatial data are stored in a database or some other repository. In some embodiments, the data is delivered to a local service representative via one or more software applications running in whole or in part on a mobile computer device, such as a tablet, a mobile phone, or some other computing device. In these cases, the representative may be in an office, on-site at the property location, or in some other location.

The local service representative is an individual skilled in structural measurements. For example, the local representative may be an on-site inspector, a claims adjuster, a surveyor, a professional engineer, a construction contractor, an underwriting inspector, a technician, a particular insurance agent, or some other individual who travels physically or virtually (e.g., via camera and other sensor equipped motor vehicle, airborne drone, or the like) to the property location, records observations, and takes one or more particular measurements. The representative may have, but is not required to have, any specific land surveying knowledge or other such professional skills. That is, by employing the systems and methods described herein, time consuming land survey processes requiring a highly skilled and licensed surveyor or engineer is no longer necessary. Instead, the measurements, calculation, and other surveying skills that had previously been performed on-site by the skilled professional are now carried out remotely and in advance of the on-site inspection.

In some cases, the local service representative travels to the subject property. The representative in these cases is able to access certain information associated with the geospatial characteristics of the property via a mobile software application operating on a particular user computer device. The information may include instructions that direct the representative in collection of additional data used to generate an elevation certificate. For example, in some cases, a mobile software application operating on the user computer device guides the on-site representative to make certain measurements and to collect other information helpful for proper completion of the elevation certificate. For example, the mobile software application may guide the local service representative through a process to measure and capture data associated with an area of a flood vent, a measurement from the top floor to the bottom floor, and the like. In some cases, these measurements may be done automatically via the user computer device. In these or in other cases, the mobile software application may also capture and communicate information derived from a camera or some other electro-optical device embedded in the user computer device, coupled to the user computer device, or otherwise associated with the user computer device. Using such an imaging means, particular measurements may be extracted through photogrammetric means and entered into the system by the local service representative via the mobile software application.

On-site measurements of a selected structure made by the representative may include a determination of the height of the bottom floor, the height of a next higher floor, the height of particular features above grade, and other like measurements. The on-site measurements may be made to a particular tolerance such as one tenth of a foot, one tenth of a meter, to a nearest inch, or some other tolerance. The representative may also be directed to observe, make determinations, and collect other data. For example, the representative may determine whether or not the selected structure has a basement, a crawlspace, or some other below-grade, at grade, and above-grade structural elements. Other structural and property attributes determined by the representative may include the presence of and particular features (e.g., measurements, locations, and the like) related to service machinery (e.g., furnace, water heater, pump, and the like), garages, carports, other ground-level non-living spaces, flood vents or other openings, and the like. In some cases, the representative may also observe or otherwise determine and record a construction type of the subject structure, one or more overhang distances representing how far a roof overhangs a foundation, and other structural features useful for a proper full-risk rate determination.

A mobile software application operating on the user computer device of a representative may also provide additional features. For example, in some embodiments, the application includes any one or more of map support to provide driving directions and property identification, measurement tools, notation support, calculation support for area and square footage determinations, structure reference diagrams, photo capturing, storage, and the like. Data entered, calculated, and otherwise associated with the mobile software application may then be communicated to one or more other systems such as an elevation certificate application stored on a remote computing server. In some cases, data communicated by one or more representatives (i.e., data associated with one or more structures on one or more properties) is accessible by quality assurance personnel or other such personnel for quality assurance, quality control, or quality assurance and quality control purposes. Such quality-based systems may in some cases be performed fully or partially by hand. In other cases, the quality-based systems are partially or fully automated using, for example, a computing device.

Subsequent to one or more certification procedures to affirm the quality and completeness of the communicated data, the data is certified. Certified data may then be used to automatically complete and document the elevation certificate form for the structure of interest. The completed form may be reviewed and authorized (e.g., signed) by a licensed professional such as a surveyor, communicated to a property owner or some other customer (e.g., mortgage entity, property management company, or the like), stored in a repository, or acted up in some other way. In cases where a customer has requested the elevation certificate, one or more processing systems may electronically handle payment. The one or more processing systems may also electronically direct distribution of fees amongst one or more parties such as the local service representative.

In addition to supporting on-site inspection, the systems and methods described herein to determine structure elevation may have utility to insurance interests, mortgage lenders, and others. Some conventional entities provide online information identifying, to an insurance company for example, whether or not a property is located within a particular flood zone type. In some cases, these entities provide a rough estimate of the ground elevation based on coarse digital elevation models. While the digital elevation models can provide a general idea of property elevation, such models are often biased by ditches and other local features that get averaged into the model. For these and other known reasons, the conventional digital elevation models are incapable of providing measurement data that meets elevation certificate standards.

Data collected and stored over time by the systems and methods described herein contribute to a comprehensive elevation inventory. That is, as a growing number of properties are analyzed, community-wide data is collected. The collected community-wide data can be analyzed comprehensively, and the comprehensive analysis is useful for catastrophe modeling that supports insurance rating and insurance linked security issues.

Figure 1:
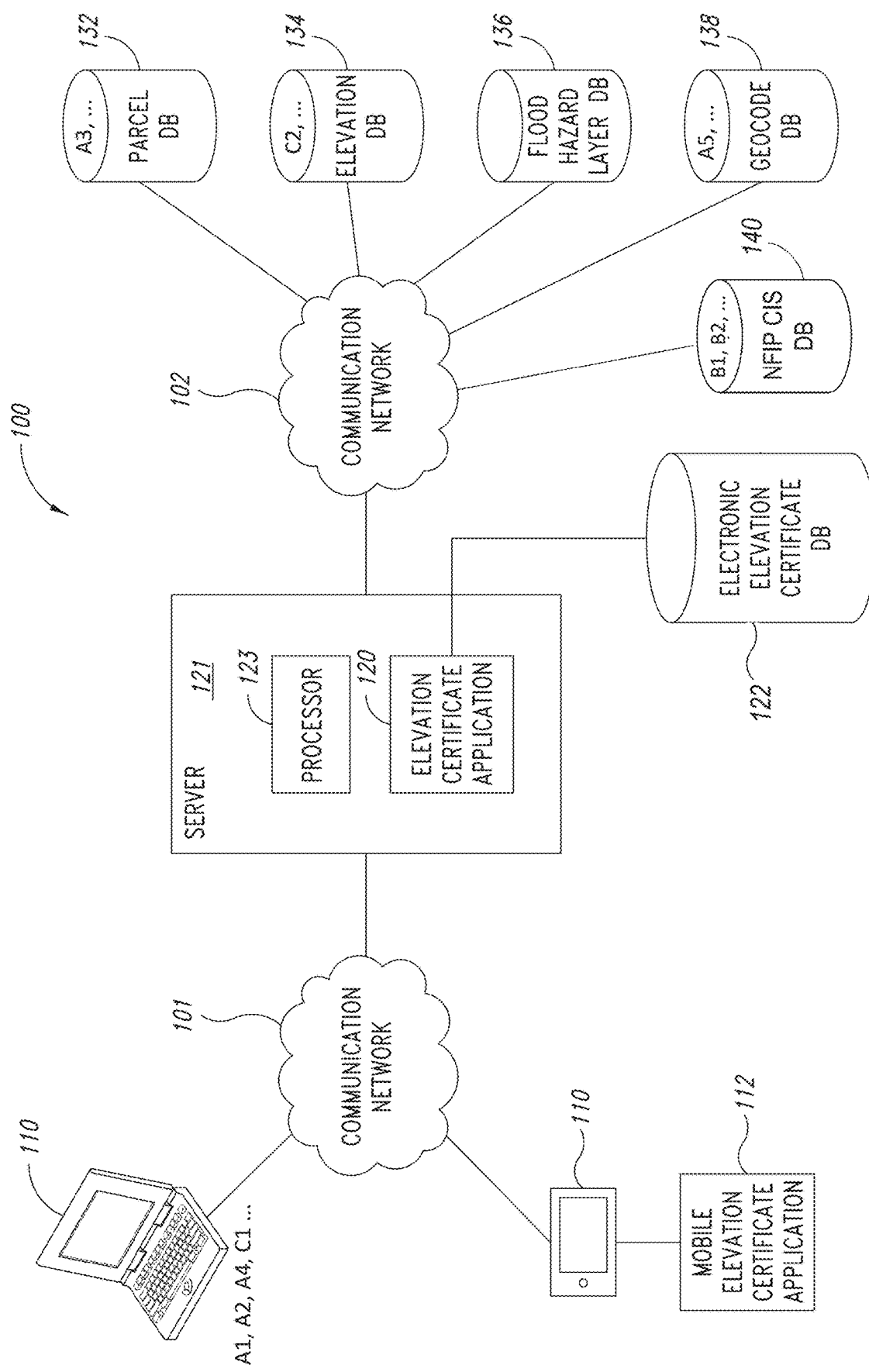
FIG. 1 is a block diagram of an automation assisted elevation certificate production system, in accordance with one or more embodiments of the disclosure.

FIG. 1 is a block diagram of an automation assisted elevation certification production system 100 (referred to hereinafter as "system 100") in accordance with embodiments of the present disclosure. As shown in FIG. 1, the system 100 includes an electronic certificate application 120, one or more communication networks 101, 102, one or more user computer devices 110, and an electronic elevation certificate database 122. The system 100 may further include a parcel database 132, an elevation database 134, a flood hazard layer database 136, a geocode database 138, National Flood Insurance Program (NFIP), Community Information Services (CIS) databases 140, and other data repositories (not shown).

A user computer device 110 is a computing device capable of communicating with, participating with, controlling, directing or being directed by, or otherwise accessing the elevation certificate application 120 via a communications network 101, 102. The user computer device 110 may be, for example, a personal computer, a tablet computer, a smartphone, or the like. The user computer device 110 may be used to by a user to enter building owner information (A1), building address information (A2), building use information (A4), building elevation information (C1), and other information (not shown).

Communications networks 101, 102 may utilize one or more protocols to communicate via one or more physical networks, including local area networks, wireless networks, dedicated communication lines, intranets, the Internet, and the like.

The elevation certificate application 120 is stored at least partially on a server computer device 121. In one or more embodiments, the elevation certificate application 120 may be a cloud-based or otherwise distributed computing application that is stored on, executed from, or otherwise deployed via one or more server computer devices. The server computer device 121 includes a processor 123, and the elevation certificate application 120 may be stored in any transitory or non-transitory computer-readable storage medium.

The processor 123 may be any one or more computing processor devices operable to execute software instructions stored in a transitory or non-transitory computer-readable storage medium, such as a memory, to perform the functions of the elevation certificate application 120 described herein.

The parcel database 132 may be one or more databases arranged to store and provide information associating location information (e.g., a property address or geocoding information for a property) with one or more land lots, plots, parcels or other such real property boundaries (referred to herein, collectively, as "parcels"). The information stored in the parcel database and retrieved therefrom may include property description information (A3) and other such information. The parcel database 132 may be a searchable database. The parcel database 132 may be or include one or more private or public databases, and may include parcel records managed, maintained or otherwise administered by a variety of sources (e.g., city, county, state or any other entity's parcel databases or other such property records management systems).

The elevation database 134 may be one or more databases arranged to store and provide elevation information (C2)

associated with particular geographical points. The elevation database 134 may be a searchable database. The elevation database 134 may be or include one or more private or public databases and may include elevation data managed, maintained or otherwise administered by a variety of sources. For example, the elevation database 134 may be or include the US Interagency Elevation Inventory, the National Elevation Dataset (NED), the National LIDAR Dataset (NLD), or both the NED and NLD. The NED and NLD are maintained by the United States Geological Survey (USGS) and available to the public. The elevation database may also contain elevation data not generally available to the public but suitable to the elevation determination purposes of the automation assisted elevation certification production system 100. The elevation information stored in the elevation database 134 may be, for example, bare earth elevation information.

The flood hazard layer database 136 may be one or more databases arranged to store and provide flood hazard information associated with particular geographical points or areas. The flood hazard layer database 136 may be a searchable database. The flood hazard layer database 136 may be or include one or more private or public databases and may include flood hazard layer data managed, maintained or otherwise administered by a variety of sources. For example, the flood hazard layer database 136 may be or include the National Flood Hazard Layer, which is managed by the Federal Emergency Management Agency (FEMA) and available to the public. The National Flood Hazard Layer is a digital database that contains flood hazard mapping data used for elevation certificate generation and useful to determine the flood zone, base flood elevation (BFE), floodway status, and other flood hazard information for a particular geographic location.

The geocode database 138 may be one or more databases arranged to store and provide geocoding information associated with particular addresses or other location information. The geocode database 138 may be a searchable database. The geocode database 138 may be or include one or more private or public databases and may include geocoding information managed, maintained or otherwise administered by a variety of sources. For example, the geocode database 138 may be or include the Census Geocoder, which is managed by the United States Census Bureau. The Census Geocoder database is publicly available and provides approximate coordinate (latitude/longitude) information for an input address. Any other geocoding tools, repositories, and the like (e.g., GOOGLE GEOCODING API and related toolset) may also be used. The geocode database 130 may be arranged to provide latitude/longitude information (A5), horizontal datum information (A5), or other geocoding information.

The National Flood Insurance Program Community Information Services (NFIP CIS) database 140 may be one or more databases arranged to store and provide community status reports or other such information by state, territory, nation, or some other designation. Information stored in the NFIP CIS database 140 may include the names and associated identification information associated with communities that participate in the National Flood Program (i.e., NFIP Community Name and Community Identification (CID) Number). Information stored in the NFIP CIS database 140 may also include county name information, state information, Flood Hazard Boundary Map (FHBM) information, various implementation and effective dates, and other like information. The NFIP CIS database 140 may be a searchable database and may be or include one or more private or public databases.

The electronic elevation certificate database 122 is arranged to store and provide electronic elevation certificates associated with real property structures. In some cases, the electronic elevation certificates stored in and retrieved from the electronic elevation certificate database 122 include information along the lines of that presented in FIGS. 5A-5F. The electronic elevation certificate database 122 may further store and provide one or more electronic elevation certificate templates. An electronic elevation certificate template may be, for example, an electronic version of the "Elevation Certificate" provided by FEMA under the National Flood Insurance Program. Representative information stored in such an elevation certificate is presented in Table 1.

TABLE 1

Representative Information In A FEMA Elevation Certificate

| Reference | Information |
| --- | --- |
| A<br>Property<br>Information | Building Owner's Name/Address<br>Property Description & Use<br>Latitude/Longitude;<br>Horizontal Datum (NAD 1927, NAD 1983)<br>Photographs<br>Crawlspace and Attached Garage Information<br>square footage<br># of permanent flood openings relative to grade<br>Total net area of flood openings<br>Engineered flood openings |
| B<br>Flood<br>Insurance<br>Rate Map<br>(FIRM)<br>Information | NFIP Community Name and Number<br>County Name and State<br>Map/Panel Number, Suffix<br>FIRM Index Date, FIRM Panel effective/revised date<br>Flood Zone(s)<br>Base Flood Elevation (BFE)<br>Source of BFE (FIS Profile, FIRM, Other)<br>BFE Elev. Datum (NGVD 1929, NAVD 1988, Other)<br>Coastal Barrier Resource System (CBRS) Data |
| C<br>Building<br>Elevation<br>Information | Basis for Elevation Data (Drawings, Actual Structure)<br>Elevations - Zones (A1-A30, AE, AH, . . . )<br>Benchmark Utilized; Vertical Datum<br>Elev. Datum (NGVD 1929, NAVD 1988, Other)<br>Top of bottom floor (incl. basement, crawlsp, etc)<br>Top of next higher floor<br>Bottom of lowest horizontal structural member<br>Attached garage (top of slab)<br>Lowest elev. of machinery servicing the bldg.<br>Lowest adjacent grade (LAG) next to bldg.<br>Highest adjacent grade (HAG) next to bldg.<br>LAG at lowest elev. of deck/stairs, incl. support |
| D<br>Surveyor,<br>Engineer,<br>Architect<br>Certif. | Certifier's Name/Title/Company, etc.<br>Certifier's License Number<br>Date of Certification<br>Certification Seal |
| E | Photographs |

The electronic elevation certificate template stored, generated, produced, or otherwise utilized in the system 100 may include a variety of blank fields to be completed using information specific to the real property structure for which the elevation certificate is requested. Further, the electronic elevation certificate database 122 may store any number of completed or partially completed electronic elevation certificates; each completed or partially completed electronic elevation certificate being associated with a particular real property structure.

The automation assisted elevation certification production system 100 allows a user of a user computer device 110 to access the elevation certificate application 120, e.g., via the communication network 101. The elevation certificate application 120 may include or otherwise provide a graphical user interface to the user (e.g., a webpage or similar access portal) through which the user may input data, view results (e.g., completed or partially completed electronic elevation certificates), or otherwise communicate with or access the functionality of the elevation certificate application 120. For example, a user of a user computer device 110 may access the elevation certificate application 120 and input owner information (A1) and an address (A2) associated with a real property structure for which the user wishes to complete an elevation certificate. Cooperatively, the elevation certificate application 120 may access one or more of the parcel database 132, the elevation database 134, the flood hazard layer database 136, the geocode database 138, and the NFIP CIS database 140. The user may be directed, guided, or otherwise inspired to generate or determine input values such as measurements for one or more fields in an elevation certificate. Operations directed by the user cause the elevation certificate application 120 to automatically complete or partially complete an electronic elevation certificate for the subject structure.

A mobile elevation certificate application 112 is stored on or otherwise accessible with a mobile user computer device 110 such as a tablet computer. The mobile elevation certificate application 112 may be used to access a new, partially completed, or fully completed elevation certificate, which may be stored in the electronic elevation certificate database 122. The elevation certificate accessed by the mobile elevation certificate application 112 is directed to a particular structure of a real property. The mobile elevation certificate application 112 may provide instructions or prompts which guide the user through a process of reviewing, amending, or otherwise completing the accessed elevation certificate. For example, the mobile elevation certificate application 112 may instruct the user to acquire certain measurements, observations, or other information that is available during an on-site survey of the property or structure. In some cases, the mobile elevation certificate application 112 facilitates quality procedures automatically, manually, or automatically and manually.

Figure 2A:
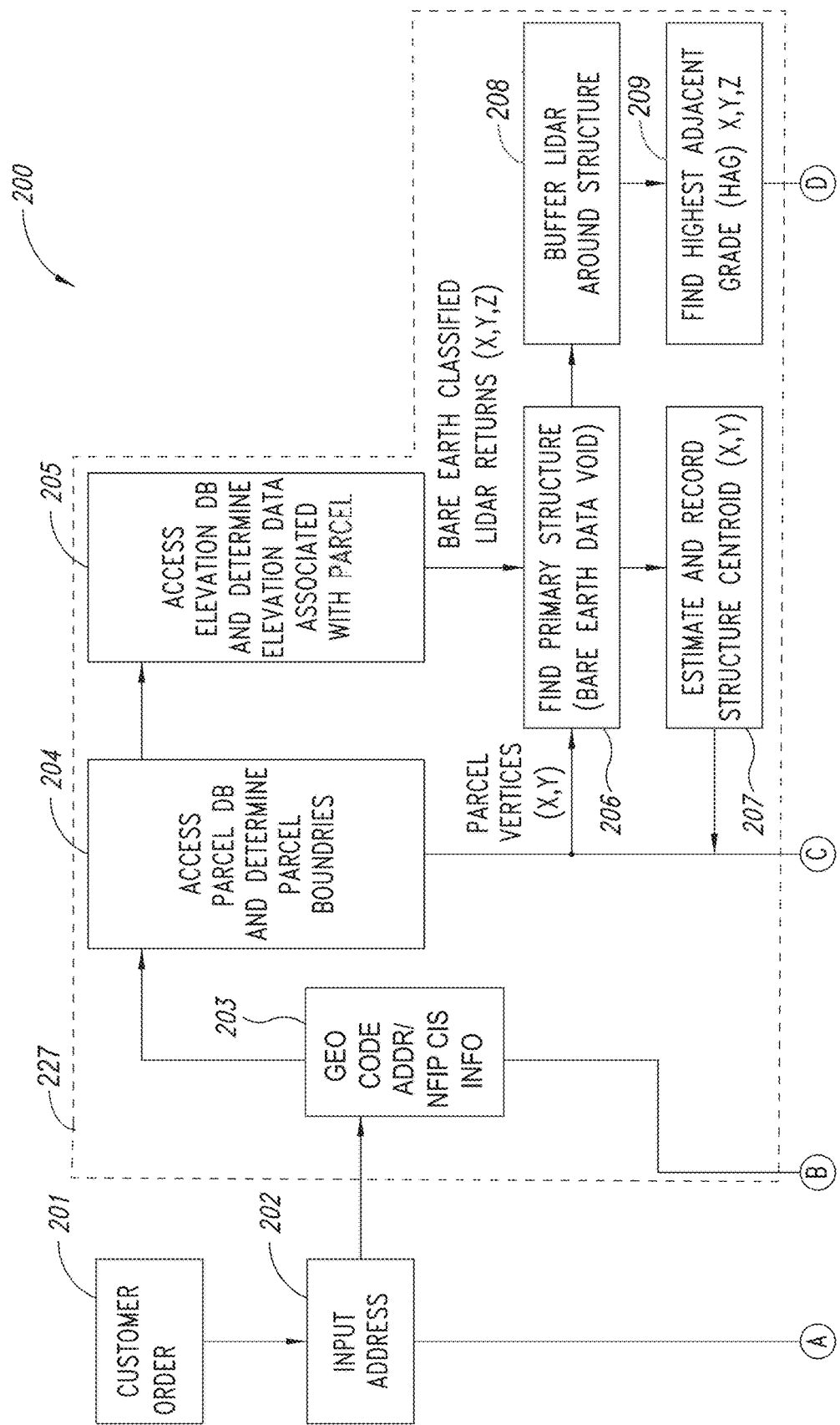
FIGS. 2A-2C are a flowchart illustrating an automation assisted elevation certificate production method, in accordance with one or more embodiments of the disclosure.
Figure 2B:
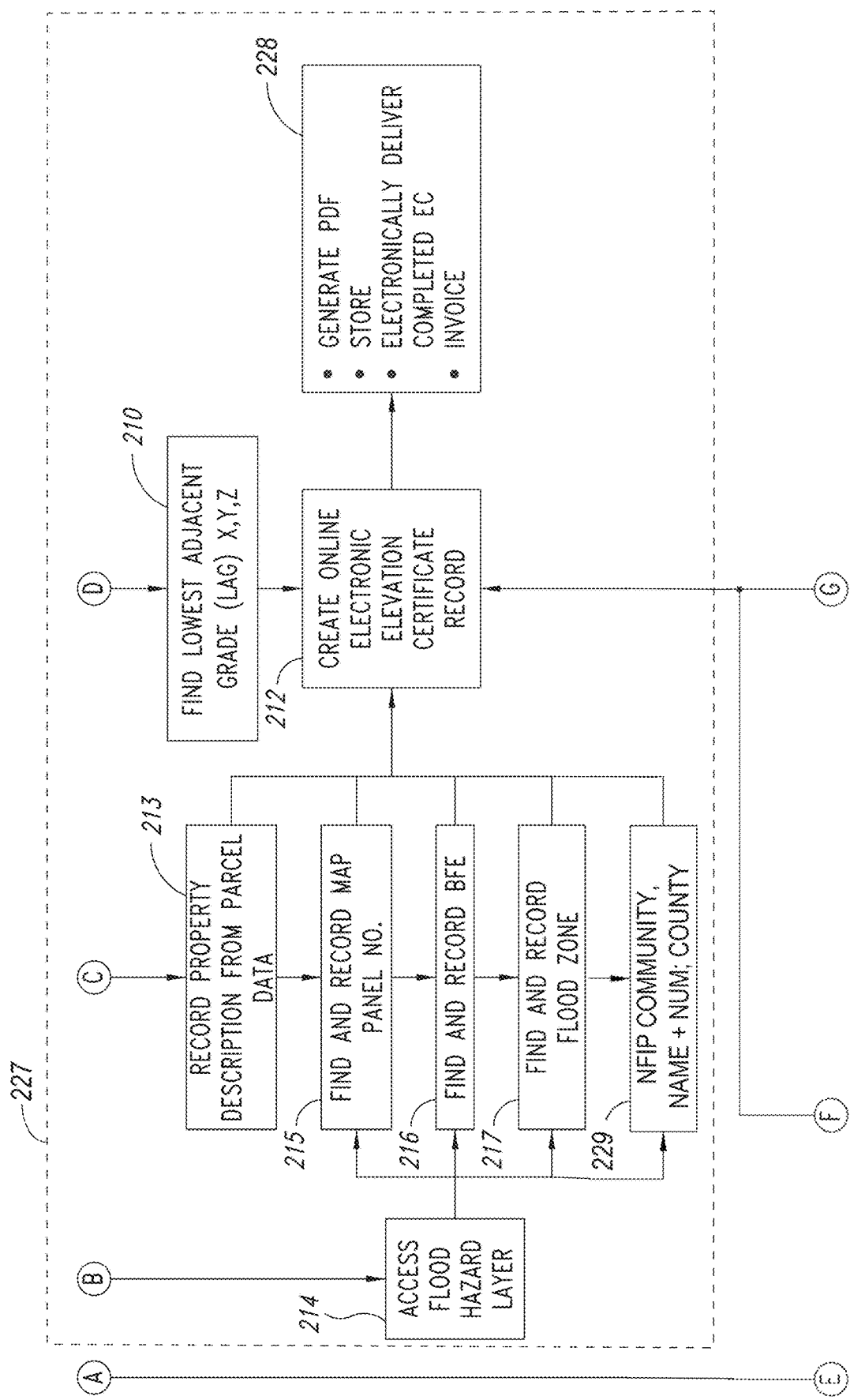
Figure 2C:
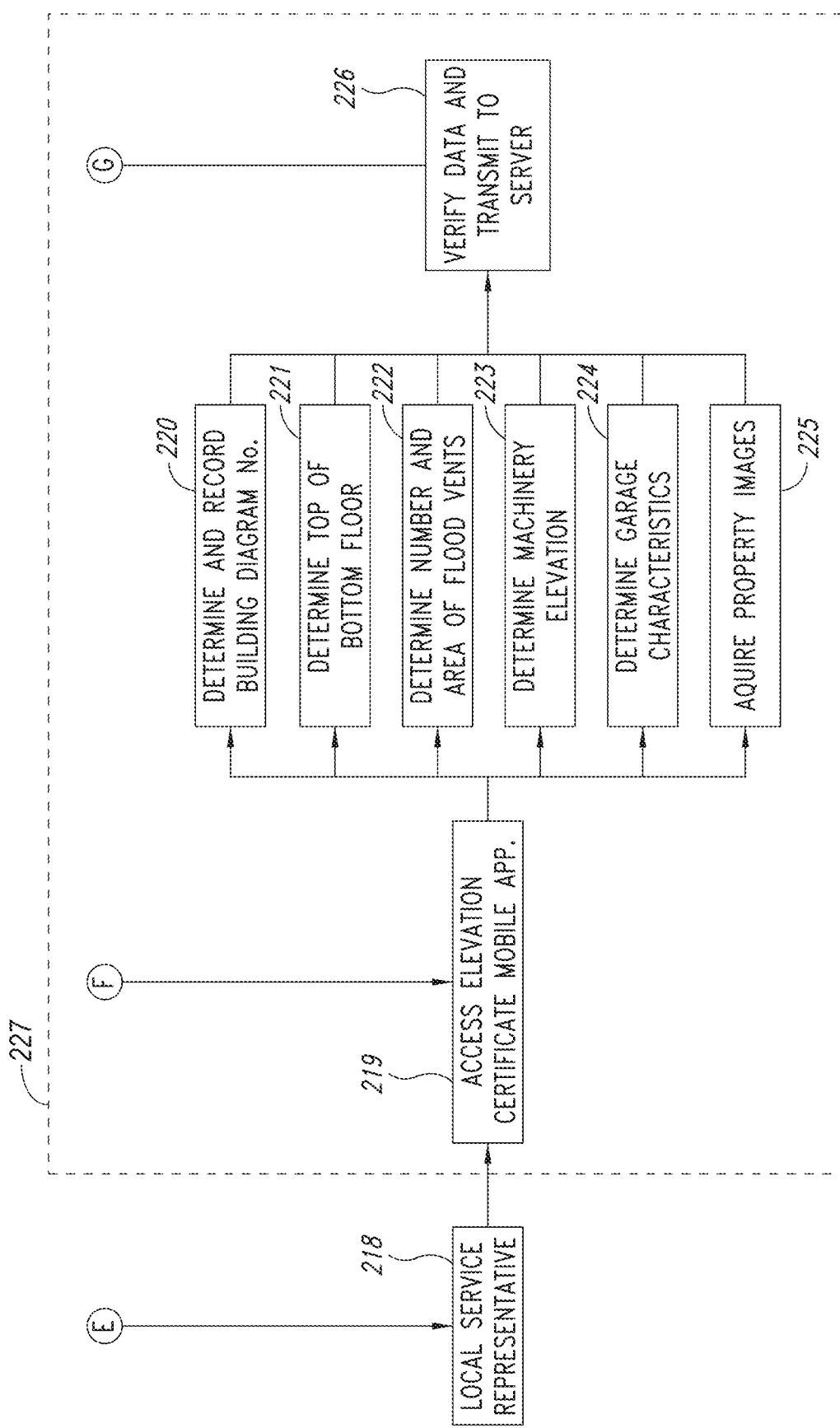

FIGS. 2A-2C, present a flowchart illustrating an automation assisted elevation certificate production method 200 in accordance with one or more embodiments. The automation assisted elevation certificate production method 200 may be performed using the automation assisted elevation certificate system 100 shown in FIG. 1.

At module 201, the method 200 begins when a user (e.g., a customer) initiates an electronic elevation certificate order. The user may initiate the order, for example, by using a user computer device 110 to access the elevation certificate application 120 via communication network 101. The access may be via a mobile elevation certificate application 112, an Internet browser, or via some other means. The user may be prompted to provide login credentials or other such authorization information in order to gain access to the elevation certificate application 120. In addition, or in the alternative, the user may provide such information to gain access to an account associated with the user. The elevation certificate application 120 may be a web-based application.

At module 202, the user may input information such as a building owner's name (A1) and an address (A2) that identifies or is otherwise associated with a real property structure (e.g., a home, commercial office building, or the like). The user takes this action because the user wishes to complete or otherwise generate a completed elevation certificate. The elevation certificate application 120 may provide (e.g., via a graphical user interface) an address or property identification field for the user to input the address or other identifying information. In some cases, for example, the other identifying information may include plat information (A3) maintained by a municipality, a photograph that is electronically matched to a specific real property structure, a business name, global positioning system (GPS) coordinates, or other like information. In this respect, in the present disclosure, the term "address" is used to identify a particular real property and structures thereon, but it is recognized that the term broadly includes any information used or usable to unambiguously identify the particular real property and its associated structures.

Once the address has been provided to the elevation certificate application 120, at module 203 the input address may be geocoded. Geocoding information for the address may be determined, for example, by the elevation certificate application 120 accessing the geocode database 138 with reference to the input address. Additionally, the address may also be used to retrieve county name and identifier information as well as other information associated with the National Flood Insurance Program from the NFIP CIS database 140. For example, the elevation certificate application 120 may provide the address to the geocode database 138, which may be, for example, the Census Geocoder or any such geocoding database alone or in cooperation with a geocoding service. From the geocode database 138 or other services, an approximate geocoded coordinate (e.g., latitude and longitude) associated with the address is retrieved.

At module 204, the elevation certificate application 120 accesses the parcel database 132, which may be for example a national parcel database, a statewide database, a regional database, or some other database. The elevation certificate application 120 receives parcel boundaries information from the particular parcel database associated with the address information, the geocoding information, of both the address and geocoding information associated with the address.

The parcel boundary associated with the address may be determined, for example, by inputting the address or geocoding information for the address into the parcel database 132 and looking up the parcel boundary associated with that address. In some cases, the parcel boundary is defined by parcel vertices (e.g., latitude and longitude coordinates corresponding to parcel boundary vertices). In this way, the parcel boundaries may be completely determined by connecting the parcel vertices by boundary line segments to form a polygonal parcel boundary. Similarly, the parcel boundary may be defined (e.g., as stored in the parcel database 132) by a complete polygonal parcel boundary that has been determined in some other way. Using the parcel boundary information, parcel vertices may be determined by the elevation certificate application 120 as desired.

At module 205, the elevation certificate application 120 accesses elevation database 134 and retrieves elevation data associated with the determined parcel boundary. The elevation database 134 may be, for example, a LIDAR database such as the National LIDAR Dataset, and may include LIDAR elevation data associated with geographic points throughout any geographical area (e.g., the United States). The LIDAR data may be bare earth classified LIDAR data points having elevation data associated with particular geocoded latitude and longitude coordinates.

In some cases, such as with LIDAR data, a field survey is also performed in cooperation with the data collection. In some cases, the field survey may include street-side photographs by a data collection operation (e.g., a mapping operation) that is manual or automatic. In these or other cases, the field survey may include human-collected survey data, remote device (e.g., satellite, airborne drone, ground based manually driven or driverless vehicle, or the like) collected data, or data collected in combination or in another way.

Using supplementary data, which may for example be collected by the provider of the database based on the field survey, one or more accuracy factors (e.g., a horizontal and vertical accuracy) may be determined. The accuracy factors can be applied to any individual data value (e.g., LIDAR return) within the database to even further improve the accuracy, reliability, and confidence in the data provided by in the database.

At module 206, the elevation certificate application 120 determines a perimeter of the subject structure. The perimeter, which may also be referred to as a primary structure boundary, is determined by analyzing the elevation data (e.g., LIDAR data points) associated with the determined parcel boundary. The primary structure may be, for example, a residential or non-residential structure for which an elevation certificate is to be completed.

The elevation data stored in the elevation database 134 may be, for example, bare earth classified LIDAR data points. As an example, the United States Geological Survey (USGS) requires LIDAR data points to be classified into one of several general categories, including bare earth (i.e. uncovered ground) classified data. Thus, by examining only bare earth classified data points associated with a particular parcel, the boundary of a real property structure of interest (e.g., a home, an office building, or the like) may be determined as being an area within the parcel having an absence of associated bare earth classified elevation data points. This is shown in further detail in FIG. 3.

Figure 3:
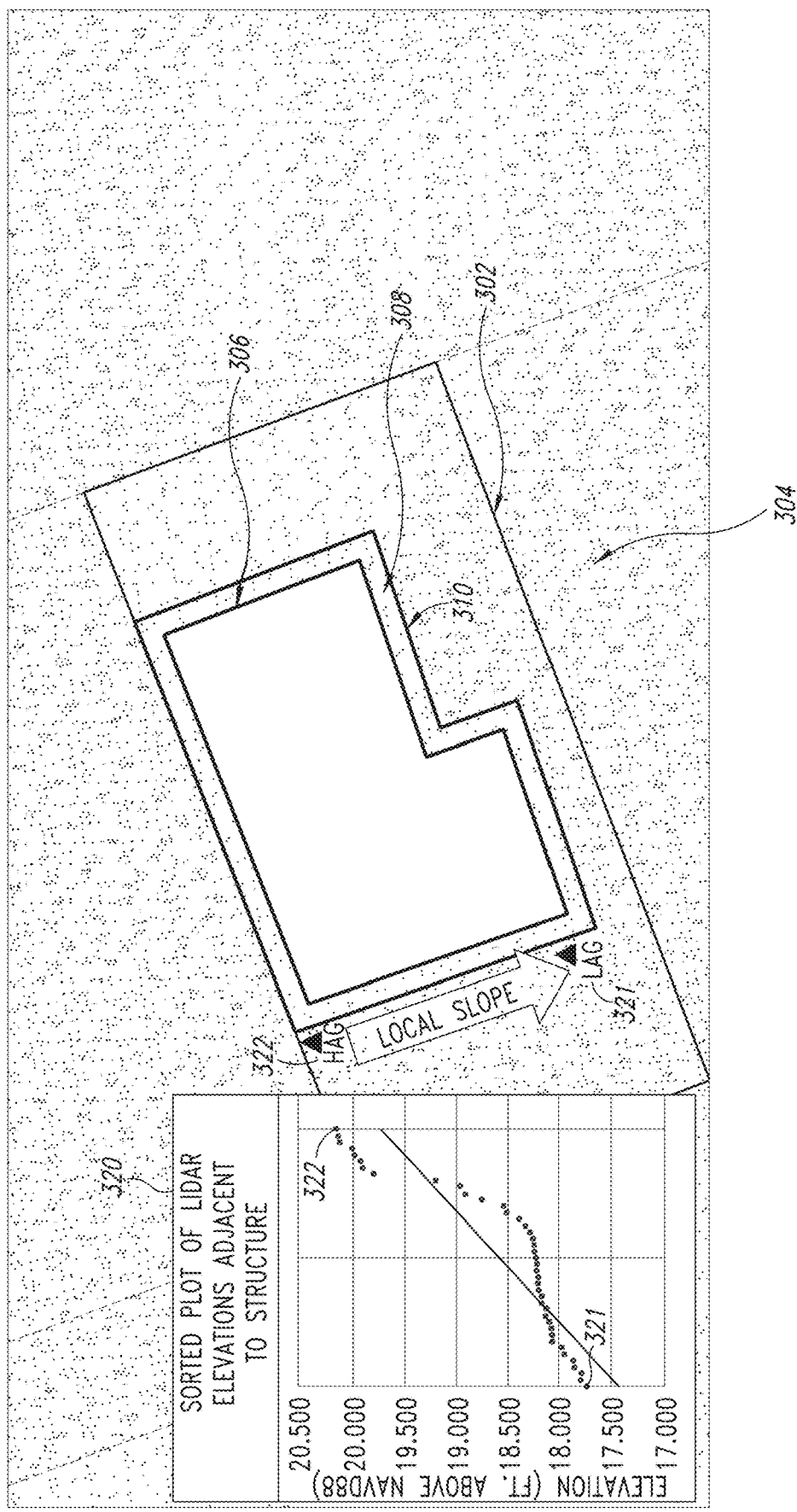
FIG. 3 schematically illustrates a method of determining a highest adjacent grade (HAG) and a lowest adjacent grade (LAG) for a parcel by analyzing the bare earth classified LIDAR data points associated with the parcel, in accordance with one or more embodiments of the disclosure.

FIG. 3 schematically illustrates a method of determining a highest adjacent grade (HAG) value and a lowest adjacent grade (LAG) value for a parcel by analyzing bare earth classified LIDAR data points associated with the parcel. The parcel boundary 302 shown in FIG. 3 may be determined, for example, as described at module 204 of the method 200 (FIG. 2A). The hundreds, thousands, or more bare earth classified LIDAR points 304 within the parcel boundary 302 describe the elevation of the bare earth at a plurality of different latitude and longitude points. However, for a substantial measurable area within the parcel boundary 302 (i.e., the area within the structure boundary 306), an absence of bare earth classified LIDAR points 304 are returned for the parcel 302 by the elevation database 134. That is, within the structure boundary 306, there are no bare earth elevation data points, and thus it is determined that there is no bare earth within the area defined by the structure boundary 306. Other attributes of non-bare earth classified points, such as height relative to classified bare earth points for example, may also be utilized to distinguish LIDAR returns associated with a structure from LIDAR returns associated with other features, such as trees.

Accordingly, within the system 100 of FIG. 1, the elevation certificate application 120 determines, based on the absence of bare earth classified LIDAR data points 304, that a primary structure of interest is located at the area within the parcel boundary 302 having no associated bare earth classified LIDAR data points 304. A structure boundary 306 (i.e., a perimeter of the structure of interest) may thus be determined by the elevation certificate application 120, for example, by forming a polygon or any other shape that defines a boundary between a bare earth area (e.g., a portion of the parcel 302 having associated bare earth classified LIDAR data points) and a non-bare earth area (e.g., the portion of the parcel 302 having no associated bare earth classified LIDAR data points).

Returning to FIG. 2A, at module 207, the elevation certificate application 120 may estimate and record the location of the centroid (e.g., latitude and longitude) for the structure determined at module 206 (e.g., the structure 306 shown in FIG. 3). One of several techniques for determining the centroid of a geometric shape, including, for example, geometric decomposition, integral formula, bounded region, and other techniques, may be suitably applied by the elevation certificate application 120 to determine the centroid of a shape defined by the structure 306. The elevation certificate application 120 may utilize the parcel vertices, which may be determined, for example, at module 204, to calculate an estimated location of the centroid of the structure 306. The centroid location (e.g., in latitude and longitude coordinates) may be provided to module 213, which is discussed in further detail herein.

At module 208, the elevation certificate application 120 determines a buffer zone 308 surrounding the structure 306. The buffer zone 308 may have an outer buffer boundary 310 that is spaced apart from the structure 306 at a fixed, predetermined distance. For example, the buffer boundary 310 may be defined as extending outwardly from the structure 306 boundary at a predetermined distance of one meter. Other predetermined distances, which in some cases are user configurable distances, are also recognized. The buffer zone 308 thus defines an area within which values representing the highest adjacent grade (HAG) and the lowest adjacent grade (LAG) may be determined. That is, the highest and lowest adjacent grades refer to points next to, or immediately next to, or otherwise in a predetermined proximity to the structure 306.

In some cases, the operations of modules 206 to 208 include additional processing to supplement data retrieved from the elevation database 134. That is, the additional processing creates or otherwise generates data that is useful in the generation of an acceptably accurate elevation certificate.

In some cases where a roof or a roof portion overhangs an outer wall of a structure by a significant distance (e.g., more than twelve inches, more than two feet, more than three feet, or more than some other distance), the elevation database 134 may not include elevation data (e.g., LIDAR data points) representing the area adjacent to the particular outer wall of the structure (i.e., data in buffer zone 308). In other cases, vegetation (e.g., trees, large bushes, grape arbors, or the like), adjacent structures (e.g., car ports, tents, awnings, or the like), or some other obstacle causes an absence of valuable elevation data adjacent to a structure or in some other area of interest.

Without additional processing, roof overhangs, porches, patios, shrubs, trees, mechanical equipment platforms, and other such obstacles often lead to incorrect HAG/LAG results. These obstacles may prevent or otherwise interfere with a LIDAR data collection system's attempts to obtain data points up against an exterior building wall. A structure's roof line may block the signal from reaching the ground directly adjacent to the structure's walls. What's more, since land often slopes away from a building for proper drainage, or since land elevation increases if the building is on a hill side, false information may be calculated.

In cases where desirable elevation data is absent, additional processing may be performed in or more of modules 206-208 to supply the missing data. The additional processing may include manual or automatic analysis of photographic data, wherein, for example, a trained artificial intelligence engine is used to estimate a roof overhang from photographic data (e.g., satellite photographs, drive-by photographs, or other photographs of the subject property). In these cases, the additional processing may create one or more three dimensional models of relevant portions of the structure and its surrounding obstructions. Using the three dimensional models, distances such as roof overhang and height of an overhang above grade, can be determined as well as compass direction or relationship to a cardinal direction, and other structural features that may affect the ability of LIDAR signals to reach the earth and reflect back toward a receiver. Accordingly, data from the three dimensional models may be used to mathematically generate trusted elevation data based on the determined roof overhang and elevation data points extrapolated to or otherwise estimated in the unknown area of interest. Similar artificial intelligence techniques may also be used to generate acceptably accurate elevation data associated with decks, vegetation, less-relevant or non-relevant structures (e.g., awnings, carports, arches, and the like). Alternatively, or in addition, human-calculated elevation data may also be generated or otherwise estimated via observation of the actual structure or associated photographic data.

At module 209, the elevation certificate application 120 determines the highest adjacent grade (HAG) value based on the elevation data points corresponding to the area within the buffer zone 308. In some cases, the HAG is determined simply as being the highest elevation point, including the latitude/longitude coordinates associated with the highest elevation point, within the buffer zone 308. As shown in FIG. 3 by the sorted plot 320 of LIDAR elevations adjacent to the structure 306 (i.e., plot of elevation data points within the buffer zone 308), the HAG 322 may be determined as being the highest elevation data point within the buffer zone 308. In the example of FIG. 3, the HAG is about 20.2 feet above NAVD88, wherein NAVD88 is the vertical control datum of orthometric height established for vertical control surveying of the United States. In the present disclosure, the HAG value represents the determined point of highest adjacent grade, and the terms "HAG" and "HAG value" are used interchangeably.

Additionally or alternatively, the elevation certificate application 120 may employ various approaches to more accurately or robustly determine the HAG. For example, a HAG value may be calculated or otherwise selected after rejecting any elevation data points 304 that may not represent the elevation of the finished grade immediately adjacent to the structure 306. In this technique, the elevation certificate application 120 rejects points that substantially differ (e.g., by more than 10 percent, more than 20 percent, or more than some other determined amount) from the local slope around the structure 306, and the elevation certificate application 120 determines the HAG based only on non-rejected elevation data points 304 within the buffer zone 308.

Figure 4A:
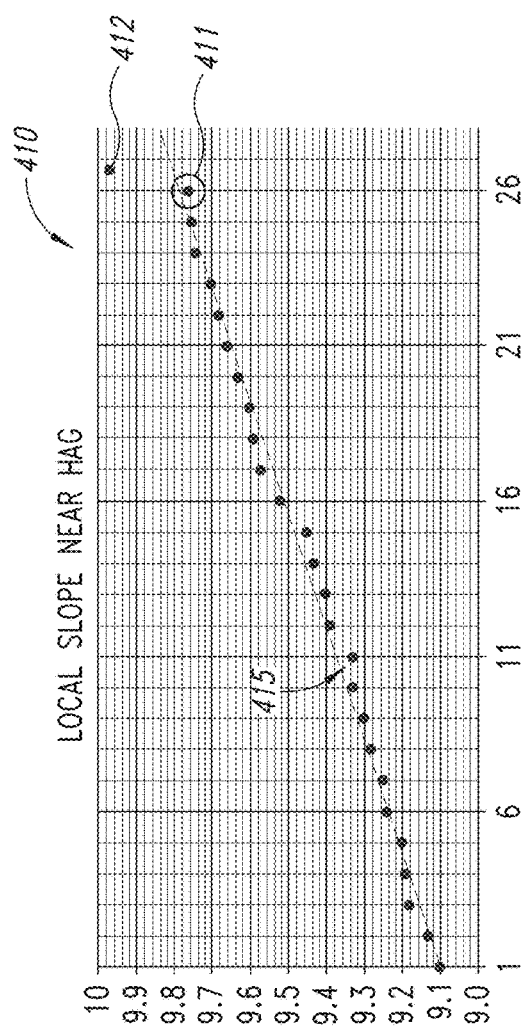
FIG. 4A is a plot of elevations near the highest adjacent grade (HAG) determined for an exemplary structure, in accordance with one or more embodiments of the disclosure.

In FIG. 4A, one approach for rejecting outlier elevation data points that may be employed by the elevation certificate application 120 is to produce a linear approximation of the high and low local slope within the buffer zone 308. FIG. 4A illustrates a plot 410 of elevations near the highest adjacent grade (HAG) 411 determined for a different exemplary structure than the one shown in the example of FIG. 3. The elevation data point associated with HAG 411 is consistent with the linear approximation of a local slope 415 (shown as a dashed line) near the HAG 411. Thus, in this exemplary technique, the elevation certificate 120 may determine that the elevation data point associated with the HAG 411 value accurately represents the highest adjacent grade, and is not an outlier point which should be rejected. On the other hand, elevation data point 412, while having a higher elevation than the determined HAG 411, deviates substantially (i.e., by nearly 30 percent of the range of the local slope 415 in this case) from the linear approximation of local slope 415. In this approach, the elevation data point 412 is rejected from the determination of the highest adjacent grade.

The elevation certificate application 120 may determine that an elevation data point should be rejected as an outlier data point based on one or more rules, based on a determination by an artificial intelligence engine, or based on some other mechanism. For example, an elevation data point may be rejected as an outlier data point if it deviates substantially (e.g., by more than 10 percent, more than 20 percent, or more than some other determined amount) from the linear approximation of the adjacent local slope 415, which may be determined based on a comparison-to-nearby-points rule, based on a standard deviation rule, or based on another rule. Other techniques for rejecting outlier points may be utilized by the elevation certificate application 120, including, for example, developing a micro digital elevation model (DEM) within the buffer zone 308 and calculating flow lines in order to isolate the points best representing the highest adjacent grade (HAG) and the lowest adjacent grade (LAG) of structure 306.

In FIG. 2B at module 210, the elevation certificate application 120 determines the lowest adjacent grade (LAG) value based on the elevation data points corresponding to the area within the buffer zone 308 (FIG. 3). In some cases, the LAG value is determined in a similar manner as described herein with respect to determining the HAG value. That is, the LAG may be determined simply as being the lowest elevation point, including the latitude/longitude coordinates associated with the lowest elevation point, within the buffer zone 308. As shown in the sorted plot 320 of LIDAR elevations adjacent to the structure 306, the LAG 321 may be determined as being the lowest elevation data point within the buffer zone 308, which in the example of FIG. 3 is about 17.8 feet above the NAVD88 level. In the present disclosure, the LAG value represents the determined point of lowest adjacent grade, and the terms "LAG" and "LAG value" are used interchangeably.

Figure 4B:
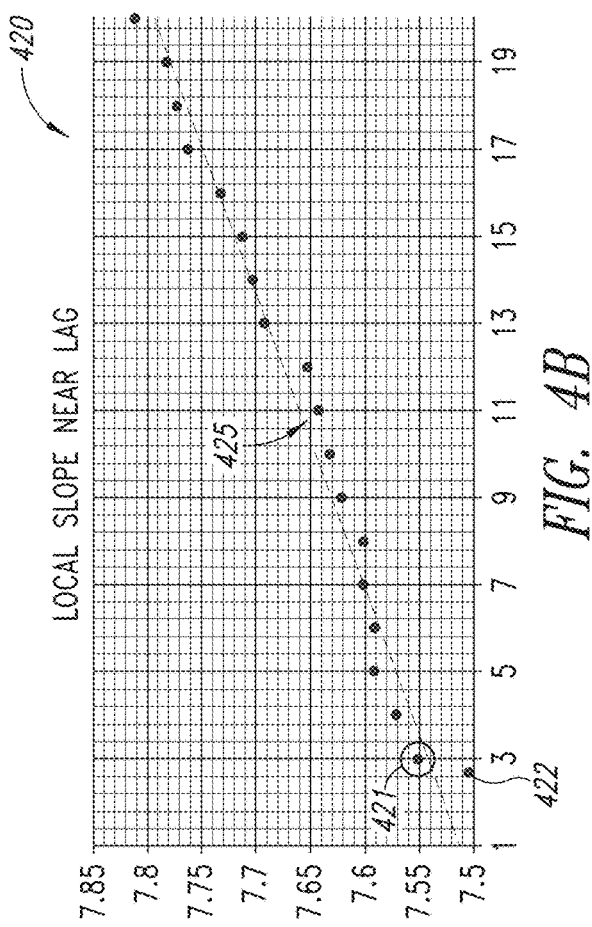
FIG. 4B is a plot of elevations near the lowest adjacent grade (LAG) determined for the same exemplary structure as the plot shown in FIG. 4A, in accordance with one or more embodiments of the disclosure.

Further, the elevation certificate application 120 may reject any outlier points within the buffer zone 308 when determining the LAG using techniques along the lines of those as described herein with respect to determining the HAG. For example, the elevation certificate application 120 may produce a linear approximation of the low local slope within the buffer zone 308. This is shown for example in FIG. 4B, which illustrates a plot 420 of elevations near the lowest adjacent grade (LAG) 421. The elevation data point associated with LAG 421 is consistent with the linear approximation of local slope 425 (shown as a dashed line) near the LAG 421. Thus, the elevation certificate 120 may determine that the elevation data point associated with the LAG 421 accurately represents the lowest adjacent grade and is not an outlier point which should be rejected. The elevation data point 422, however, deviates substantially (i.e., by about 10 percent of the range of the local slope 425 in this case) from the linear approximation of local slope 425. In this approach, the elevation data point 422 is rejected from the determination of the lowest adjacent grade.

In some cases, LAG and HAG values are computed during the creation of a particular elevation certificate 120. For example, LAG and HAG values may be computed "on the fly" only when an elevation certificate for an individual property is requested by a customer. Alternatively, two or more LAG and HAG values may be bulk processed for a database of parcels or some other group of parcels. In this second case, a database or some other structure of LAG and HAG elevation values may be built and stored in advance. Then, reconsidering the processing flow of FIGS. 2A, 2B at 209 and 210, respectively, program flow would retrieving the LAG and HAG values stored in the preprocessed structure (e.g., database) rather than computing LAG and HAG values on the fly.

At module 212, the elevation certificate application 120 creates an electronic elevation certificate for the structure 306. The electronic elevation certificate may be created, for example, by first retrieving a template electronic elevation certificate from the electronic elevation certificate database 122. Additional information associated with the structure 306 is then provided and populated into one or more fields of the electronic elevation certificate. For example, at module 212, the highest adjacent grade (HAG) value determined at module 209 and the lowest adjacent grade (LAG) value determined at module 210 may be entered into an electronic elevation certificate record created for the structure 306. The electronic elevation certificate may be stored in and retrieved from the electronic elevation certificate database 122.

Referring again to module 204 in FIG. 2A, the parcel database 132 may include property description information associated with the parcel 302 (FIG. 3). For example, the parcel database 132 may include a parcel ID number, lot and block numbers, tax parcel number, a legal description, and any other such descriptive information associated with the parcel 302. This information associated with the parcel 302 may be accessed from the parcel database 132 at module 204, and this information may be recorded at module 213. The information may also be provided to the electronic elevation certificate created for the structure 306 at module 212. Further, the location of the structure centroid (e.g., determined in latitude and longitude coordinates) determined at module 207 may be recorded at module 213, and the centroid location information may be automatically input by the elevation certificate application 120 into the electronic elevation certificate record for the structure 306 at module 212.

At module 214, the elevation certificate application 120 may access the flood hazard layer database 136 with reference to the geocoded address information or the county information provided at module 203. The flood hazard layer database 136 may be or may include, for example, the National Flood Hazard Layer, which is a digital database that contains flood hazard mapping data. The National Flood Hazard Layer provides users with information representative of or otherwise used to determine the flood zone, base flood elevation (BFE), and floodway status for a particular geographic location.

By accessing the flood hazard layer database 136, the elevation certificate application 120 may, at module 215, find and record a map panel number in the flood hazard layer database 136 that is associated with the input geocoded address for the structure 306. Similarly, at module 216, the elevation certificate application 120 may find and record the base flood elevation (BFE) for the geocoded address for the structure 306, as provided in the flood hazard layer database 136. And, at module 217, the elevation certificate application 120 may find and record flood zone information associated with the input geocoded address for the structure 306, as provided in the flood hazard layer database 136. Along these lines, at module 229, the elevation certificate application 120 may retrieve and record NFIP community name, county name, and other such information stored in the NFIP CIS database 140.

The map panel number, base flood elevation (BFE), flood zone information, and other information determined at modules 215, 216, 217, and 229, respectively, are automatically input into the electronic elevation certificate record for the structure 306 at module 212.

In FIG. 2C, at module 218, the method 200 may optionally provide a notification to a local service representative that an electronic elevation certificate for a particular structure (e.g., structure 306) is partially completed, or in the process of being completed. The notification may be provided to a user computer device 110 through a mobile elevation certificate application 112, an Internet browser, electronic mail (i.e., email), or via some other like means. Identification of the property, which may include a real property street address of the structure, for example, may be provided to the local service representative at module 218. The identification information may be communicated by any method of electronic communication, including, for example, text message, email, telephone call, or the like.

After the local service representative has received notice that an electronic elevation certificate for a structure needs to be completed, verified, or otherwise attended to by the local service representative, the local representative may, at module 219, access the partially completed electronic elevation certificate. The partially completed electronic elevation certificate, which may be stored in the electronic elevation certificate database 122 or in some other repository, may be accessed via a user computer device 110 utilizing the mobile elevation certificate application 112 or some other mechanism. The mobile elevation certificate application 112 may be an application stored on or otherwise executed by a user computer device 110. Additionally or alternatively, a user such as the local service representative may access the partially completed electronic elevation certificate by accessing the elevation certificate application 120 via a user computer device 110.

In some embodiments, the mobile elevation certificate application 112 is a module provided by the elevation certificate application 120 for use on a mobile computer device 110. In other embodiments, the mobile elevation certificate application 112 is a separate software application that is stored on or executed by the mobile computer device 110. The mobile elevation certificate application 112 may include a graphical user interface that displays a variety of different prompts, messages, or the like in order to guide the local service representative through a process of completing the electronic elevation certificate for the structure 306. For example, an elevation certificate may require certain information to be provided that should be obtained on the basis of an on-site inspection. This information may include, for example, determining and recording a building diagram number (at module 220), determining an elevation of the top of the bottom floor (at module 221), determining a number and area or location of flood vents (at module 222), determining the lowest elevation of machinery or equipment servicing the building (at module 223), determining garage characteristics associated with the structure 306, such as elevation at the top of slab (at module 224), and acquiring property images (at module 225). The mobile elevation certificate application 112 may also direct the local service representative in the observation, collection, measurement, or otherwise capture and entry of any other information useful to generate a completed elevation certificate.

Utilizing the mobile elevation certificate application 112, and with access to the partially completed electronic elevation certificate for the structure 306 stored in the electronic elevation certificate database 122, the local service representative may visit the site of the structure 306 and acquire and record the information at modules 220 to 225 based on prompts or guidance provided by the mobile elevation certificate application 112.

At module 226, the information obtained and recorded at one or more modules, including modules 220 to 225, may be verified and communicated to a remote computing device. The information may be communicated to the elevation certificate application 120 or some other module operating on the server computer device 121. The verification operations in module 226 may in some cases cooperate with an optional quality control module 227. As evident in each of FIGS. 2A, 2B, and 2C, portions of the optional quality control module 227 may cooperatively interact, direct, or be directed by one or more modules of the elevation certificate production method 200.

The optional quality control module 227 provides quality assurance features to users and other stakeholders of the elevation certification production system 100. In some cases, the stakeholders confidence in the results of the system 100 can be determined by examining ancillary data and statistical results from elevation certificate production method 200 processing. Some such results are derived from metadata associated with the remotely sensed data (e.g., LiDAR data), and in these cases, the metadata provides details regarding the quality of the LiDAR dataset. Others such results may for example be derived from analysis of the records detailing dates of LIDAR data collection, dates of structure construction, dates of photographic data, or other such records analysis. Yet additional quality assurance may result from manual or automatic machine examination of the LIDAR point cloud and development of a three dimensional digital elevation model (DEM) at an acceptable "highest" resolution. In these cases, the manual or automatic machine examination may be determined or otherwise influenced by the LIDAR point horizontal point density.

In other cases, the optional quality control module 227 provides additional analysis associated with a determined depth of roof overhang as a roof line extends further away from a structure's wall. Certain roof overhang features are described herein with respect to modules 206-206, and in cases where generated elevation data is incorrect, incomplete, or otherwise inaccurate, then particular LIDAR derived elevation results can be negatively impacted.

In modules 209 and 210, respectively, of the elevation certificate production method 200, Highest Adjacent Grade (HAG) and Lowest Adjacent Grade (LAG) of the ground surrounding a structure of interest are determined. It has been determined by the inventors that when LIDAR data density is less than two points per square meter, Highest Adjacent Grade (HAG) and Lowest Adjacent Grade (LAG) results may suffer. In at least some of these cases, the determined HAG, LAG, or HAG and LAG values will become unacceptable. For these reasons, the optional quality control module 227 may provide particular processing to establish one or more data density thresholds used in the determination of supplementary elevation data.

In some cases of LIDAR data sets retrieved from the elevation database 134, the vertical precision of the data is measured in centimeters. In other cases, for example where only older or lower quality LiDAR data is available, a different vertical precision is recognized. In these cases, it has been determined that HAG and LAG results can be negatively affected. That is, generated HAG and LAG information can fall outside of one or more accuracy requirements (e.g., six (6) inches, 12 inches, or another distance) designated by a government agency (e.g., FEMA). In these cases, the optional quality control module 227 may report the horizontal point density and vertical precision of LIDAR data used for the HAG and LAG calculations and decide whether the calculations require further investigation by a human analyst. In the alternative, or in addition, the human analyst, the local representative, or another person may be notified via verification module verify 226.

Another quality assurance test that may be performed by the optional quality control module 227 is an analysis of one or more building construction dates against a LIDAR dataset published date. If the LIDAR data was collected before the building was finished, or if other construction has been performed, one or more calculations executed by the elevation certificate production method 200 may be invalid or otherwise deemed unacceptable. In these cases, the optional quality control module 227 may alert a local representative, collect additional data, or take some other action.

Yet one more quality assurance test optionally performed includes a recognition that retrieved elevation data is of low quality or otherwise has a reduced reliability. For example, certain LIDAR data sets are provided with point classifications, and other LIDAR data sets are not. These point classifications may, for example, declare each point in a dataset to be a building, bare earth, vegetation, water, or some other state. When the optional quality control module 227 determines that the elevation data is unclassified, the module 227 may search for and find appropriate classifications. In other cases, the module 227 will manually or automatically generate these items. In still other cases, the module 227 will notify a user.

In some cases, the optional quality control module 227 works cooperatively with any one or more of the modules of the elevation certificate production method 200 to generate, evaluate, and act on a confidence score. In some cases, for example, a "perfect" confidence score is loaded during initialization of the elevation certificate production method 200. This initial confidence score may for example be 1000, 100, or some other value. During subsequent processing, various ones of the elevation certificate production method 200 modules may act to reduce or increase the confidence score. If the confidence score falls below a determined threshold, the optional quality control module 227 may alert a user, perform additional analysis or quality processing, or take some other action. In some cases, module 227 is arranged to evaluate and take action according to a plurality of different confidence score thresholds.

Verification at module 226 may complete processing, for example, by displaying the information input at various modules such as modules 220 to 225. The display may be presented to the local service representative, and the representative may be provided with a prompt to confirm or otherwise verify that the information input to the electronic elevation certificate or otherwise presented is accurate.

After verification, the information obtained at modules 220 to 225 may be provided into the electronic elevation certificate created for the structure 306 at module 212, thereby completing the electronic elevation certificate.

At module 228, the completed electronic elevation certificate for the structure 306 is stored as a completed certificate in the electronic elevation certificate database 122. An electronic version of the elevation certificate (e.g., a portable document format (PDF) document) may be generated and electronically delivered to a surveyor, engineer, architect, or other like professional (e.g., through the system 100 to an associated user computer device 110) for signature and certification. In addition, or in the alternative, the electronic version of the elevation certificate may be delivered to a user that requested the elevation certificate. The delivery to the user may be before the elevation certificate is signed by a licensed professional, after the elevation certificate is signed by the licensed professional, or both before and after the elevation certificate is signed by the licensed professional. Additionally, the elevation certificate application 120 may provide an invoice for payment by the user after the elevation certificate has been completed.

Certain words and phrases used in the present disclosure are set forth as follows. The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Other definitions of certain words and phrases are provided throughout this patent document. Those of ordinary skill in the art will understand that in many, if not most instances, such definitions apply to prior as well as future uses of such defined words and phrases.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

As illustrated in FIG. 1, user computer devices 110 may be coupled through one or more communication networks 101, 102 to a server computer device 121. In other cases, the user computer devices 110 may operate with features of a server computer device 121, and in such cases, the elevation certificate application 120 may be contained in a single computing device such as a user computer device 110. For simplicity, embodiments are described herein in the context of server computer device 121, but it is understood that such embodiments could also be carried out within a single user computer device 110.

In addition to the structures expressly illustrated in the non-limiting embodiment of user computer devices 110 and server computer device 121 in FIG. 1, the computing devices also includes operative hardware found in a conventional computing apparatus such as one or more processing units (e.g., processor 123), communication port modules, serial and parallel input/output (I/O) modules compliant with various standards and protocols, wired and/or wireless networking modules (e.g., a communications transceiver), multimedia input and output modules, and the like.

A processor (i.e., a processing unit), as used in the present disclosure, refers to one or more processing units individually, shared, or in a group, having one or more processing cores (e.g., execution units), including central processing units (CPUs), digital signal processors (DSPs), microprocessors, micro controllers, state machines, execution units, and the like that execute instructions.

As known by one skilled in the art, the computing devices described herein have one or more memories to store data and processor-executable instructions such as the mobile elevation certificate application 112 and the elevation certificate application 120. In the present disclosure, memory may be used in one configuration or another. The memory may be configured to store data. In the alternative or in addition, the memory may be a non-transitory computer readable medium (CRM) wherein the CRM is configured to store instructions executable by a processor. The instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of the systems, methods, and apparatus described in the present disclosure.

FIG. 1 illustrates portions of a non-limiting embodiment of a user computing device 110, and a server computing device 121. When so arranged as described herein, each computing device may be transformed from a generic and unspecific computing device to a combination device comprising hardware and software configured for a specific and particular purpose. The combination device, when employed as described herein, provides improvements to flood risk estimating technology, insurance technology, real property purchase planning technology, and many other technologies. Computing devices 110, 121 include operative hardware found in a conventional computing apparatus such as one or more central processing units (CPUs), volatile and non-volatile memory, serial and parallel input/output (I/O) circuitry compliant with various standards and protocols, and/or wired and/or wireless networking circuitry (e.g., a communications transceiver).

As known by one skilled in the relevant art, a computing device has one or more memories, and each memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a flash memory device, a CD-ROM, and/or the like. In some cases, a particular memory is separated virtually or physically into separate areas, such as a first memory, a second memory, a third memory, etc. In these cases, it is understood that the different divisions of memory may be in different devices or embodied in a single memory.

The computing devices (e.g., user computer devices 110 and server computer device 121) further include operative software found in conventional computing devices such as an operating system, software drivers to direct operations through the I/O circuitry, networking circuitry, and other peripheral component circuitry. In addition, the computing devices may include operative application software such as network software for communicating with other computing devices, database software for building and maintaining databases, and task management software for distributing the communication and/or operational workload amongst various (CPUs). In some cases, the computing devices used herein are a single hardware machine having the hardware and software listed herein, and in other cases, the computing devices are a networked collection of hardware and software machines working together in a server farm to execute the functions of the automation assisted elevation certificate production system 100. The conventional hardware and software of the computing devices discussed herein (e.g., user computer devices 110 and server computer device 121) is not shown for simplicity.

As used in the present disclosure, the term "module" refers to an application specific integrated circuit (ASIC), an electronic circuit, a processor and a memory operative to execute one or more software or firmware programs, combinational logic circuitry, or other suitable components (hardware, software, or hardware and software) that provide the functionality described with respect to the module. Several program modules are stored within one or more of the memory structures described herein. The program modules present executable instructions to the one or more processors described herein to carry out the features of one or both of the mobile elevation certificate application 112 and the elevation certificate application 120.

FIGS. 2A-2C are a flowchart illustrating an automation assisted elevation certificate production method 200 that may be used by embodiments of the computing devices that implement the automation assisted elevation certificate production system 100 described herein. In this regard, each described process (or each described module within a described process) may represent a subroutine, segment, or portion of code, which comprises one or more executable instructions for implementing the specified logical function(s). It should also be noted that in some implementations, the functions noted in the process may occur in a different order, may include additional functions, may occur concurrently, and/or may be omitted.

In the foregoing description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks, have not been shown or described in detail to avoid unnecessarily obscuring descriptions of the embodiments.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for determining elevation based on structural modeling and light detection and ranging (LIDAR) data, comprising:
   determining a parcel boundary for a property, the parcel boundary corresponding to a polygon in accordance with latitude and longitude coordinates;
   obtaining LIDAR bare earth data corresponding to an area within the parcel boundary, as preliminary elevation data;
   determining a basis of structure boundary for a structure within the parcel boundary based, at least in part, on an absence of the LIDAR bare earth data within a region in the area within the parcel boundary;
   generating one or more three-dimensional models based, at least in part, on photographic data of the property, the one or more three-dimensional models representing one or more portions of the structure that shadow earth from LIDAR signals to reach earth and reflect back toward a receiver;
   determining a structure boundary for the structure based, at least in part, on the basis of structure boundary in combination with supplemental elevation data generated using the one or more three-dimensional models;
   determining a buffer boundary, the buffer boundary having a same shape as the structure boundary and extending outwardly from the structure boundary by a fixed distance;
   determining adjacent grade values based, at least in part, on a portion of the preliminary elevation data and supplemental elevation data that corresponds to an area between the structure boundary and the buffer boundary; and
   obtaining a flood insurance estimate based, at least in part, on the adjacent grade values.

2. The method of claim 1, wherein the one or more portions of the structure includes at least one of roof overhang, porch, patio, shrub, tree, or mechanical equipment platform.

3. The method of claim 1, further comprising identifying and excluding one or more outlier elevation data points within the portion of the preliminary elevation data and supplemental elevation data.

4. The method of claim 3, wherein identifying the one or more outlier elevation data points comprises:
   generating a linear approximation of a local slope in the area between the structure boundary and the buffer boundary based on the preliminary elevation data and supplemental elevation data; and
   identifying one or more outlier elevation data points in the area between the structure boundary and the buffer boundary that deviate substantially from the linear approximation of the local slope.

5. The method of claim 3, wherein determining the adjacent grade values is further based on the excluding of the one or more outlier elevation data points.

6. The method of claim 1, wherein determining the adjacent grade values comprises determining a highest adjacent grade (HAG) value and a lowest adjacent grade (LAG) value.

7. The method of claim 6, further comprising:
   determining geocoding information identifying a first location corresponding to the HAG value; and
   determining geocoding information identifying a second location corresponding to the LAG value.

8. The method of claim 6, further comprising:
   automatically inputting the HAG value and the LAG value into an electronic elevation certificate record associated with the property.

9. A non-transitory computer-readable storage medium having stored contents that, when executed by one or more processors, cause the one or more processors to perform actions comprising:

obtaining LIDAR bare earth data corresponding to an area within a parcel boundary, as preliminary elevation data;

determining a basis of structure boundary for a structure within the parcel boundary based, at least in part, on an absence of the LIDAR bare earth data within a region in the area within the parcel boundary;

generating one or more three-dimensional models based, at least in part, on photographic data associated with the structure, the one or more three-dimensional models representing one or more portions of the structure that shadow earth from LIDAR signals to reach earth and reflect back toward a receiver;

determining a structure boundary for the structure based, at least in part, on the basis of structure boundary in combination with supplemental elevation data generated using the one or more three-dimensional models;

determining a buffer boundary, the buffer boundary extending outwardly from the structure boundary;

determining adjacent grade values based, at least in part, on a portion of the preliminary elevation data and supplemental elevation data that corresponds to an area between the structure boundary and the buffer boundary; and applying the adjacent grade values to an estimation of flood insurance.

10. The computer-readable storage medium of claim 9, wherein the one or more portions of the structure includes at least one of roof overhang, porch, patio, shrub, tree, or mechanical equipment platform.

11. The computer-readable storage medium of claim 9, wherein the actions further comprise identifying and excluding one or more outlier elevation data points within the portion of the preliminary elevation data and supplemental elevation data.

12. The computer-readable storage medium of claim 11, wherein identifying the one or more outlier elevation data points comprises:

generating a linear approximation of a local slope in the area between the structure boundary and the buffer boundary based on the preliminary elevation data and supplemental elevation data; and identifying one or more outlier elevation data points in the area between the structure boundary and the buffer boundary that deviate substantially from the linear approximation of the local slope.

13. The computer-readable storage medium of claim 11, wherein determining the adjacent grade values is further based on the excluding of the one or more outlier elevation data points.

14. The computer-readable storage medium of claim 9, wherein determining the adjacent grade values comprises determining a highest adjacent grade (HAG) value and a lowest adjacent grade (LAG) value.

15. A system, comprising:
one or more processors; and
memory storing contents that, when executed by the one or more processors, cause the system to:

obtain LIDAR bare earth data corresponding to an area within a parcel boundary, as preliminary elevation data;

determine a basis of structure boundary for a structure within the parcel boundary based, at least in part, on an absence of the LIDAR bare earth data within a region in the area within the parcel boundary;

generate one or more three-dimensional models based, at least in part, on photographic data associated with the structure, the one or more three-dimensional models representing one or more portions of the structure that shadow earth from LIDAR signals to reach earth and reflect back toward a receiver;

determine a structure boundary for the structure based, at least in part, on the basis of structure boundary in combination with supplemental elevation data generated using the one or more three-dimensional models;

determine a buffer boundary, the buffer boundary extending outwardly from the structure boundary;

determine adjacent grade values based, at least in part, on a portion of the preliminary elevation data and supplemental elevation data that corresponds to an area between the structure boundary and the buffer boundary; and use the adjacent grade values to obtain an estimate of flood insurance.

16. The system of claim 15, wherein the one or more portions of the structure includes at least one of roof overhang, porch, patio, shrub, tree, or mechanical equipment platform.

17. The system of claim 15, wherein the contents further cause the system to identify and exclude one or more outlier elevation data points within the portion of the preliminary elevation data and supplemental elevation data.

18. The system of claim 17, wherein identifying the one or more outlier elevation data points comprises:

generating a linear approximation of a local slope in the area between the structure boundary and the buffer boundary based on the preliminary elevation data and supplemental elevation data; and identifying one or more outlier elevation data points in the area between the structure boundary and the buffer boundary that deviate substantially from the linear approximation of the local slope.

19. The system of claim 17, wherein determining the adjacent grade values is further based on the excluding of the one or more outlier elevation data points.

20. The system of claim 15, wherein determining the adjacent grade values comprises determining a highest adjacent grade (HAG) value and a lowest adjacent grade (LAG) value.

* * * * *